June 17, 1924.
W. J. MARSH
FEED MIXING MACHINE
Original Filed March 29, 1921
1,498,286
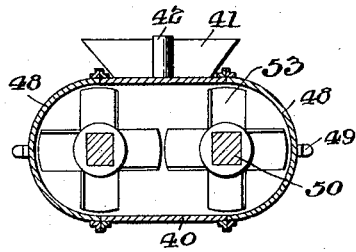
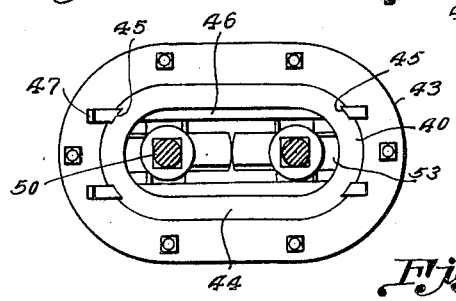
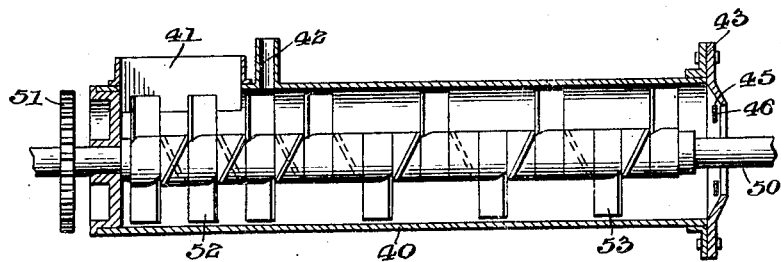
W. J. Marsh
INVENTOR
BY Victor J. Evans
ATTORNEY
WITNESS:

Patented June 17, 1924.

1,498,286

UNITED STATES PATENT OFFICE.

WARREN J. MARSH, OF SEATTLE, WASHINGTON.

FEED-MIXING MACHINE.

Original application filed March 29, 1921, Serial No. 456,433. Divided and this application filed July 10, 1922. Serial No. 573,767.

*To all whom it may concern:*

Be it known that I, WARREN J. MARSH, a citizen of the United States, residing at Seattle, in the county of King and State of Washington, have invented new and useful Improvements in Feed-Mixing Machines, of which the following is a specification.

This invention relates to mixing machines and in common with the invention constituting the subject of my prior application filed March 29, 1921, Serial Number 456,433, of which this application is a division, the present invention has for its object the provision of a machine for mixing preferably hot molasses with alfalfa meal or other ground food stuff whereby to form a feed for cattle.

Another object is the provision of a device of this character including rotary shafts in parallelism operating within a casing and carrying a series of mixing blades spirally arranged and disposed gradually close together toward the discharge end so as to cause the exertion of pressure at the discharge end which will effect the retardation of the discharge.

With the above and other objects and advantages in view, the invention consists in the details of construction to be hereinafter more fully described and claimed and illustrated in the accompanying drawings in which:

Figure 1 is a cross-section of my novel device taken at one end of the casing.

Figure 2 is a cross-section of the device at an intermediate point in the length of the casing.

Figure 3 is a vertical longitudinal section of the device.

Referring more particularly to the drawings, it will be noted that I provide a single casing 40 which is provided at one end with a hopper 41 and a molasses inlet pipe 42 and which has this end otherwise closed and which has its other end provided with a head 43 formed with an opening 44 at the sides of which are disposed guides 45 between which is slidable a plate 46 having a handle 47. This casing is somewhat oval in cross section and elongated in a horizontal plane. The casing has portions 48 removable and provided with handles 49. Journaled longitudinally within the casing 40 are shafts 50 disposed one beside the other and these shafts carry intermeshing gears 51 whereby they may be rotated simultaneously in opposite directions when their shaft is rotated by any suitable means, not shown. Secured upon the shaft 50 are paddles or blades 52 and 53. The blades 52 are comparatively close together and are arranged at equal distances apart at the inlet end of the casing. These blades are formed double whereas the blades 53 are single and are arranged spirally around their shafts.

In the operation of the device the molasses and feed introduced at the inlet end of the casing will be thoroughly mixed and passed along the casing by the paddles 53 to the discharge end thereof, the discharge being retarded so that the material will back up and be under pressure so that all parts of the dry material will be moistened with the molasses. The mixed matter of course discharges through the opening 44 in the head 43.

Having thus described my invention I claim:

1. A mixing machine comprising a casing provided at one end with an inlet hopper and an inlet pipe, said end of the casing being closed, a head secured upon the other end of the casing and provided with an opening, a plate slidably associated with said head whereby to partially cover said opening, shafts arranged alongside each other and rotatable within said casing, and a plurality of mixing blades carried by each of said shafts, the blades at the end of the casing beneath the hopper being formed double and the blades toward the other end of the casing being formed single, said last-named blades being arranged spirally upon the shaft.

2. A mixing machine comprising a casing provided at one end with an inlet hopper and an inlet pipe, said end of the casing being closed, a head secured upon the other end of the casing and provided with a discharge orifice, adjustable means for varying the size of said orifice, shafts arranged alongside each other and rotatable within said casing, and a plurality of mixing blades carried by each of said shafts, the blades at the end of the casing beneath the hopper being formed double and the blades toward the other end of the casing being formed single, said last-named blades being arranged spirally upon the shaft.

In testimony whereof I affix my signature.

WARREN J. MARSH.